United States Patent
Smith

(10) Patent No.: US 9,610,814 B1
(45) Date of Patent: Apr. 4, 2017

(54) COMBINATION TOW STRAP AND JUMPER CABLES FOR VEHICLES

(71) Applicant: John Smith, Wasilla, AK (US)

(72) Inventor: John Smith, Wasilla, AK (US)

(*) Notice: Subject to any disclaimer, the term of this patent is extended or adjusted under 35 U.S.C. 154(b) by 0 days.

(21) Appl. No.: 14/989,151

(22) Filed: Jan. 6, 2016

(51) Int. Cl.
*B60D 1/18* (2006.01)
*B60D 1/62* (2006.01)
*H01R 11/24* (2006.01)

(52) U.S. Cl.
CPC ............... *B60D 1/62* (2013.01); *B60D 1/18* (2013.01); *H01R 11/24* (2013.01)

(58) Field of Classification Search
CPC ... B60D 1/62; B60D 1/58; B60D 1/18; B60D 1/187; H01R 11/24; B66C 1/12; B66C 1/18
USPC ............... 280/415.1; 294/74, 82.11, 82.13
See application file for complete search history.

(56) References Cited

U.S. PATENT DOCUMENTS

| | | | | |
|---|---|---|---|---|
| 3,678,438 A * | 7/1972 | Gamson | ............... | H01R 13/562 439/445 |
| 4,037,720 A * | 7/1977 | McGurk | ............... | H01B 7/06 174/135 |
| 4,897,044 A * | 1/1990 | Rood | ............... | G01R 31/041 320/105 |
| 5,113,981 A * | 5/1992 | Lantz | ............... | F16F 7/006 182/3 |
| 7,306,253 B2 * | 12/2007 | Markley | ............... | B60D 1/52 280/480 |
| 7,669,904 B1 * | 3/2010 | Carmichael | ............... | B66C 1/12 294/74 |
| 2006/0186856 A1 * | 8/2006 | Lott | ............... | H01R 13/44 320/105 |
| 2014/0161370 A1 * | 6/2014 | Tuchman | ............... | B60D 1/18 383/4 |

* cited by examiner

*Primary Examiner* — Joseph Rocca
*Assistant Examiner* — Michael Stabley
(74) *Attorney, Agent, or Firm* — Michael J. Tavella

(57) ABSTRACT

A tow strap and set of jumper cables in one. With this device, a driver can jump start a vehicle or tow a vehicle with a single device. The device has a set of jumper cables that are embedded within a pair of tow straps that are sewn together in one form; or where the strap is folded over the cable and sewn, in a second model. In both cases, exits are provided for the clip portions of the jumper cables. Clips can be attached to the strap to hold the clip portions of the jumper cables as well. One design uses alligator clips for the jumper cables. Other designs use DC plugs and threaded nuts. These connectors can be used in pairs or can be mixed as desired.

11 Claims, 5 Drawing Sheets

COMBINATION TOW STRAP AND JUMPER CABLES FOR VEHICLES

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to tow straps and jumper cables for vehicles and particularly to combination tow strap and jumper cables for vehicles.

2. Description of the Prior Art

Ever since vehicles were invented, people have had to tow or extricate them from occasionally difficulties. As vehicles improved and modern wheeled vehicles were developed, the need for tow straps persists.

With the advent of battery starters and batteries for vehicles, came the need for dealing with the occasional dead battery. Thus, the standard set of jumper cables was developed. Most sets of jumper cables are very similar—usually two colored lengths of cable that have a large alligator clamps attached at each end. These clamps attach to the dead battery and to a battery in operating vehicle.

Because of their unrelated purposes, many people carry a set of jumper cables as well as a separate tow strap in their vehicles.

BRIEF DESCRIPTION OF THE INVENTION

The instant invention is a tow strap and set of jumper cables in one. With this device, a driver can jump start a vehicle or tow a vehicle with a single device. That increases the space to carry other emergency or non-emergency items. Moreover, it is less likely to misplace wither one of these devices when they are made as one unit.

In a first embodiment, the device has a set of jumper cables that are embedded within a pair of tow straps that are sewn together. In a second embodiment, the strap is folded over the cable and sewn. In both cases, exits are provided for the clip portions of the jumper cables. Clips can be attached to the strap to hold the clip portions of the jumper cables as well.

DETAILED DESCRIPTION OF THE INVENTION

Figure 1:
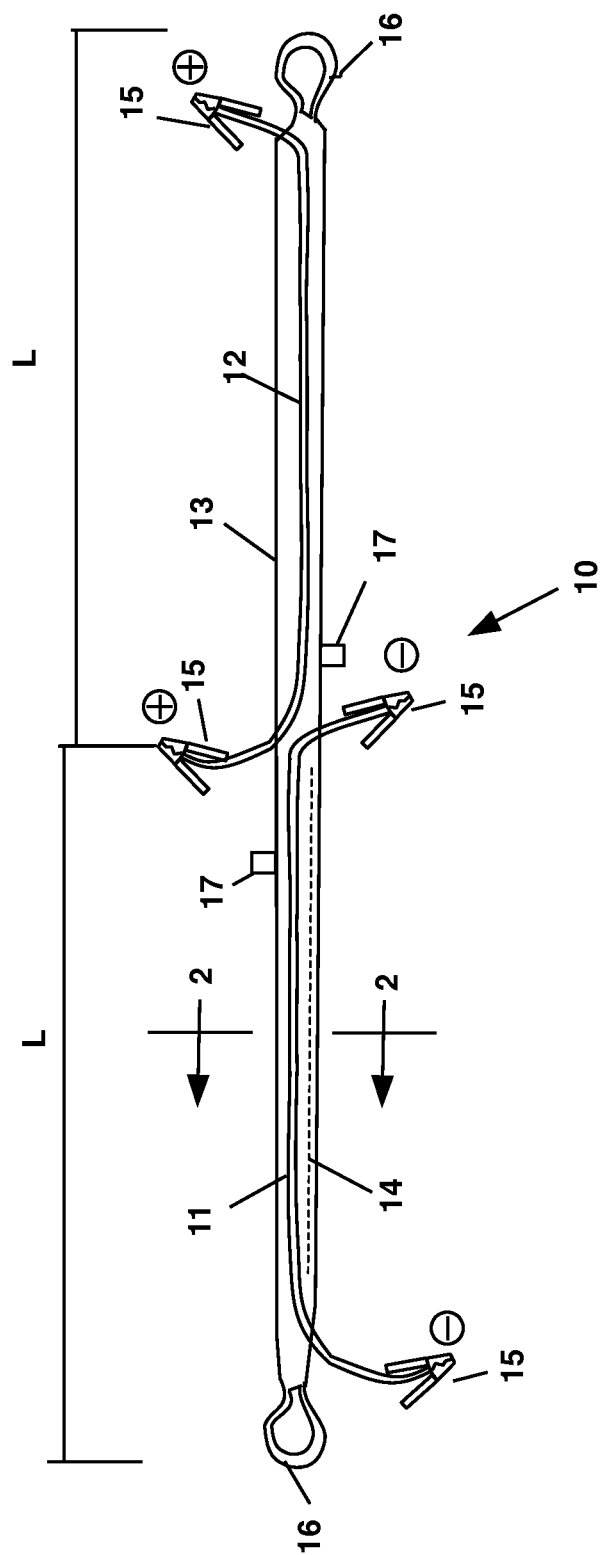
FIG. 1 is a top plan view of the first embodiment of the invention.
Figure 2:
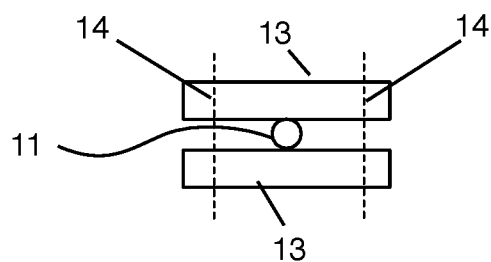
FIG. 2 is a cross-section of the invention taken along the lines 2-2 of FIG. 1.

Referring now to FIGS. 1 and 2, a top plan view of the first embodiment 10 of the invention is shown. This embodiment uses a double strap configuration in which the jumper cables 11, for the negative set and 12 for the positive set, are placed between lengths of tow strap 13. Then, the ends of the straps 13 are sewn with stitches 14 as shown. Note the stitches are ended where the cables exit the tow strap as shown.

As usual, the ends of the jumper cables are fitted with large alligator style clips 15. The ends of the tow strap are fitted with eyes 16 that are sewn in place.

As shown, the length of the strap is approximately 20 feet in the preferred embodiment. More that the jumper cables are approximately 10 feet long, which makes the unit divided equally, as shown by the lines marked L.

In the preferred embodiment, the strap is made up of two 2-inch lengths of strap that are sewn together. The tow strap is designed for two different ratings—a light duty rating at approximately 10,000 pounds, or a heavy-duty strap rated at approximately 20,000 pounds.

Another feature is a set of clips 17. These spring clips are used to hold the two center alligator clips. In this way, they are less likely to be damaged when the tow strap is being used. When needed to jumpstart a vehicle, the alligator clips 15 can be easily removed from the spring clips 17, ready for use.

Figure 4:
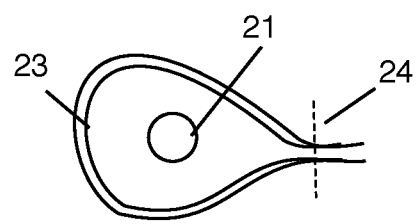
FIG. 4 is a cross-section of the invention taken along the lines 4-4 of FIG. 2.
Figure 3:
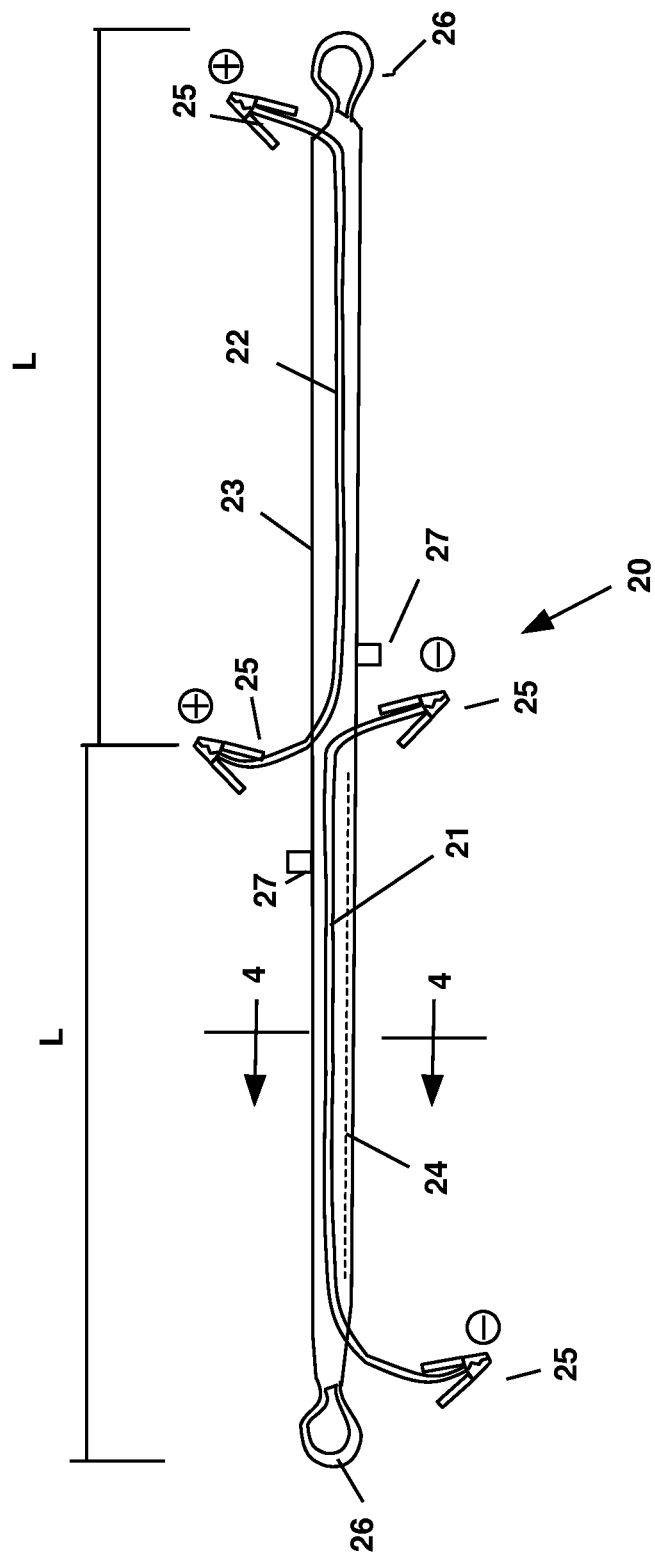
FIG. 3 is a top plan view of the second embodiment of the invention.

FIG. 3 is a top plan view of the invention the second embodiment 20 of the invention. This embodiment has identical features as the first embodiment, except that instead of using two lengths of 2-inch strapping sewn at the sides, this embodiment uses one piece of 4-inch strapping that is folded over and sewn on the open end. This is shown in FIG. 4. I all other aspects, this embodiment is the same as the first. It has the jumper cables 21, for the negative set and 22 for the positive set are placed inside the tow strap 23. Then, the open end of the strap 23 is sewn with stitches 24 as shown. Note the stitches are ended where the cables exit the tow strap as shown.

As usual, the ends of the jumper cables are fitted with large alligator style clips 25. The ends of the tow strap are fitted with eyes 26 that are sewn in place.

As shown, the length of the strap is approximately 20 feet in the preferred embodiment. More that the jumper cables are approximately 10 feet long, which makes the unit divided equally, as shown by the lines marked L.

In the preferred embodiment, the strap is made up of two 2-inch lengths of strap that are sewn together. The tow strap is designed for two different ratings—a light duty rating at approximately 10,000 pounds, or a heavy-duty strap rated at approximately 20,000 pounds. As before, a set of clips 27 is provided to hold the center alligator clips in place until needed.

Figure 5:
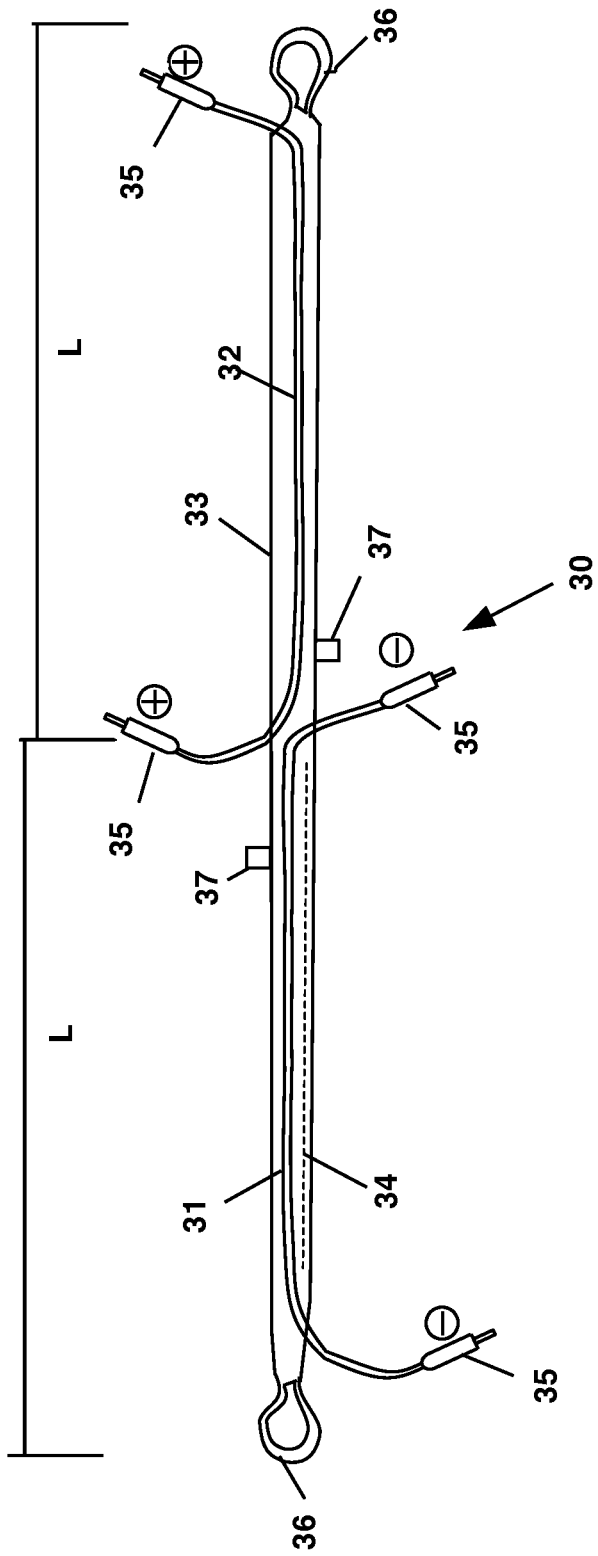
FIG. 5 is a top plan view of a first alternate connection system for the invention.
Figure 6:
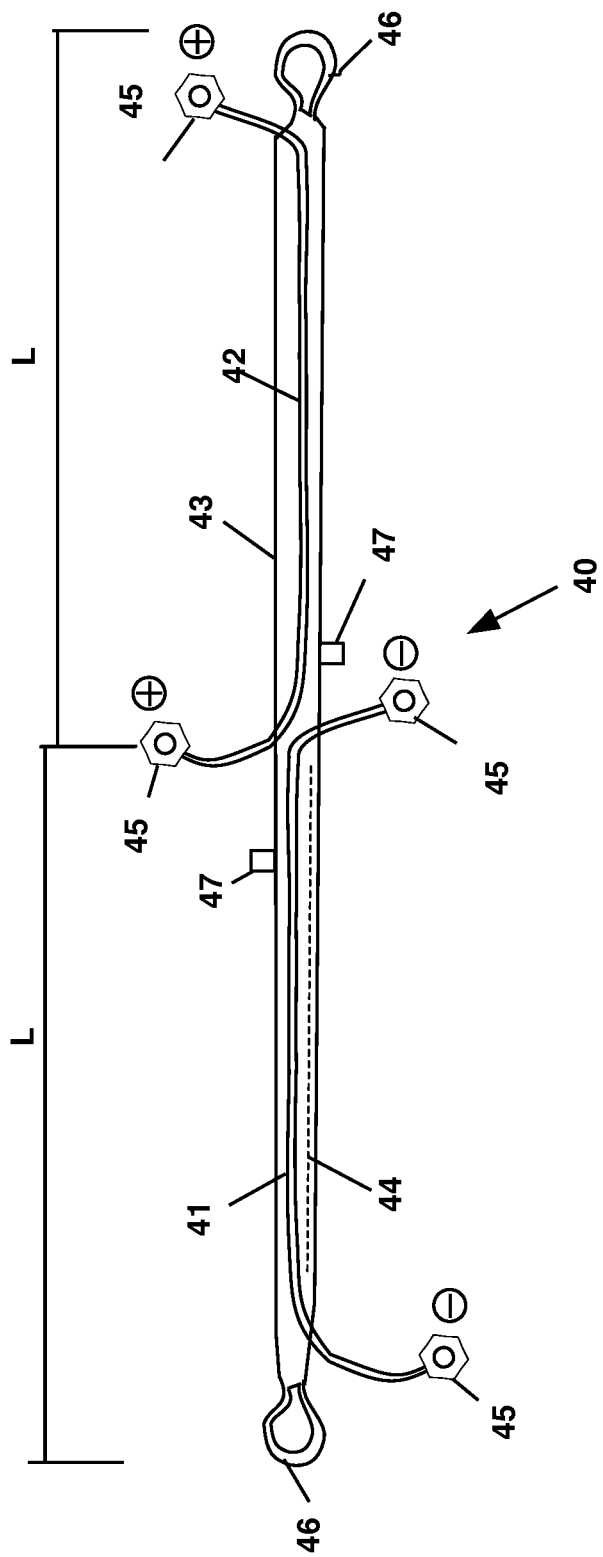
FIG. 6 is a top plan view of a second alternate connection system for the invention.

FIGS. 5 and 6 show alternate connection systems for the invention. FIG. 5 shows a system using DC power plugs that can connect to receptacles used for charging some vehicle batteries. In this embodiment 30 the jumper cables 31, for the negative set and 32 for the positive set, are placed between lengths of tow strap 33. Then, the ends of the straps 33 are sewn with stitches 34 as shown. Note the stitches are ended where the cables exit the tow strap as shown. In this embodiment, the ends of the jumper cables are fitted with DC plugs 35. The ends of the tow strap are fitted with eyes 36 that are sewn in place. This embodiment includes a set of clips 37. These spring clips are used to hold the two center plugs. In this way, they are less likely to be damaged when the tow strap is being used. When needed to jumpstart a vehicle, the plugs 35 can be easily removed from the spring clips 37, ready for use.

FIG. 6 shows a system using threaded nuts that can be tightened down to certain types of vehicle batteries that have threaded posts. In this embodiment 40 the jumper cables 41, for the negative set and 42 for the positive set, are placed between lengths of tow strap 43. Then, the ends of the straps 43 are sewn with stitches 44 as shown. Note the stitches are ended where the cables exit the tow strap as shown. In this embodiment, the ends of the jumper cables are fitted with threaded nuts 45. The ends of the tow strap are fitted with eyes 46 that are sewn in place. This embodiment includes a set of clips 47. These spring clips are used to hold the two center nuts. In this way, they are less likely to be damaged when the tow strap is being used. When needed to jumpstart a vehicle, the threaded nuts 45 can be easily removed from the spring clips 47, ready for use.

Note that the embodiments shown in FIGS. 5 and 6 can be used in either embodiment of two strap configurations. Moreover, it is readily apparent that the device can be set up with any combination of alligator clips, plugs or nuts as desired. Moreover, the alligator clips, plugs and nuts can be thought of as a means for connecting a jumper cable to a battery terminal.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A tow strap and jumper cable apparatus comprising:
 a) a first length of tow strap having a left end and a right end and a center;
 b) a second length of tow strap, being positioned above said first length of tow strap such that said first length of tow strap and said second length of tow strap are in horizontal alignment;
 c) a first jumper cable, having two ends, each of said two ends of said first jumper cable having a means for attaching said jumper cable to a battery terminal attached thereto, said first jumper cable being positioned between said first and second length of tow straps such that one of said means for attaching said jumper cable to a battery terminal exits said left end and the other of said means for attaching said jumper cable to a battery terminal exits at the center of said first and second length of tow straps;
 d) a second jumper cable, having two ends, each of said two ends of said first jumper cable having a means for attaching said jumper cable to a battery terminal attached thereto, said second jumper cable being positioned between said first and second length of tow straps such that one of said means for attaching said jumper cable to a battery terminal exits said right end and the other of said means for attaching said jumper cable to a battery terminal exits at the center of said first and second length of tow straps;
 e) whereby said first and second length of tow straps are sewn together with stitching to secure said first and second jumper cables therein.

2. The apparatus of claim 1 further comprising:
 a) a first eye, attached to said left end of said first and second lengths of tow straps; and
 b) a second eye, attached to said right end of said first and second lengths of tow straps.

3. The apparatus of claim 1 further comprising a pair of spring clips, attached to said first and second lengths of tow straps near the center of said first and second lengths of tow straps such that one of said pair of spring clips is aligned with the means for attaching said jumper cable to a battery terminal on said first jumper cable that exits at the center of said first and second lengths of tow straps, and the other of said pair of spring clips is aligned with the means for attaching said jumper cable to a battery terminal on said second jumper cable that exits at the center of said first and second lengths of tow straps.

4. The apparatus of claim 3 wherein the means for attaching said jumper cable to a battery terminal on said first jumper cable that exits at the center of said first and second lengths of tow straps is clipped into one of said pair of spring clips located near the center of said first and second lengths of tow straps, and the means for attaching said jumper cable to a battery terminal on said second jumper cable that exits at the center of said first and second lengths of tow straps is clipped into the other of said pair of spring clip located near the center of said first and second lengths of tow straps when said first and second jumper cables are not being used.

5. The apparatus of claim 1 wherein the stitching on said first and second lengths of said tow strap is open near the center of said first and second lengths of said tow strap to allow the means for attaching said jumper cable to a battery terminal said first and second jumper cables to exit said first and second lengths of said tow strap.

6. The apparatus of claim 1 wherein the means for attaching said jumper cable to a battery terminal is selected from the group of an alligator clip, a DC plug, and a threaded nut.

7. A tow strap and jumper cable apparatus comprising:
 a) a length of tow strap having a left end and a right end, a center, a first side and a second side;
 b) a first jumper cable, having two ends, each of said two ends of said first jumper cable having means for attaching said jumper cable to a battery terminal attached thereto, said first jumper cable being positioned between said left and right ends of said tow strap such that one of said means for attaching said jumper cable to a battery terminal exits said left end and the other of said means for attaching said jumper cable to a battery terminal exits at the center of said length of tow strap;
 c) a second jumper cable, having two ends, each of said two ends of said first jumper cable having means for attaching said jumper cable to a battery terminal attached thereto, said second jumper cable being positioned between said left and right ends of said tow strap such that one of said means for attaching said jumper cable to a battery terminal exits said right end and the other of said means for attaching said jumper cable to a battery terminal exits at the center of said length of tow strap;
 e) whereby the first side of length of tow strap is folded over until the first side of said tow strap is aligned with said second side of said length of said tow strap, whereby further wherein said first and second sides of said length of tow strap are sewn together to secure said first and second jumper cables therein.

8. The apparatus of claim 7 further comprising:
a) a first eye, attached to said left end of said length of tow strap; and
b) a second eye, attached to said right end of said first and second length of tow strap.

9. The apparatus of claim 7 further comprising a pair of spring clips, attached to said length of tow strap near the center of said length of tow strap such that one of said pair of spring clips is aligned with the means for attaching said jumper cable to a battery terminal on said first jumper cable that exits at the center of said length of tow straps, and the other of said pair of spring clips is aligned with the means for attaching said jumper cable to a battery terminal on said second jumper cable that exits at the center of said length of tow strap.

10. The apparatus of claim 9 wherein the means for attaching said jumper cable to a battery terminal on said first jumper cable that exits at the center of said length of tow strap is clipped into one of said pair of spring clips located near the center of said length of tow strap, and the means for attaching said jumper cable to a battery terminal on said second jumper cable that exits at the center of said length of tow strap is clipped into the other of said pair of spring clips located near the center of said length of tow strap when said first and second jumper cables are not being used.

11. The apparatus of claim 7 wherein the means for attaching said jumper cable to a battery terminal is selected from the group of an alligator clip, a DC plug, and a threaded nut.

\* \* \* \* \*